April 22, 1930.                J. H. GRAHAM                1,755,645
                                 BRAKE SHOE
                              Filed Aug. 5, 1927
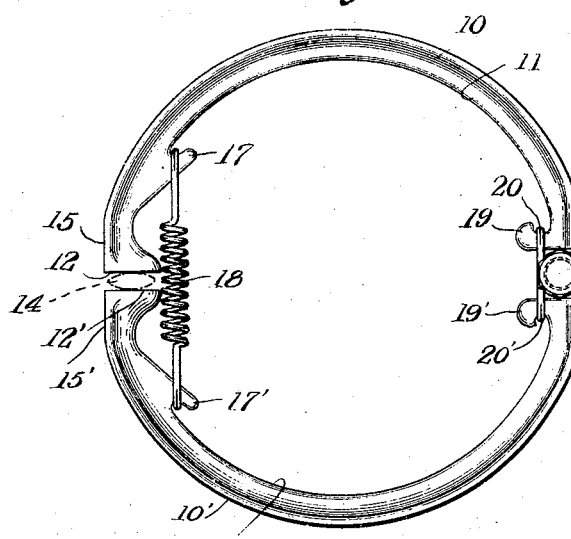
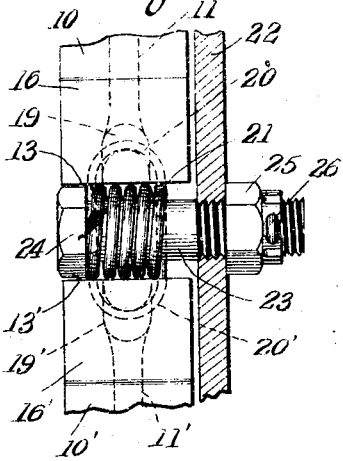
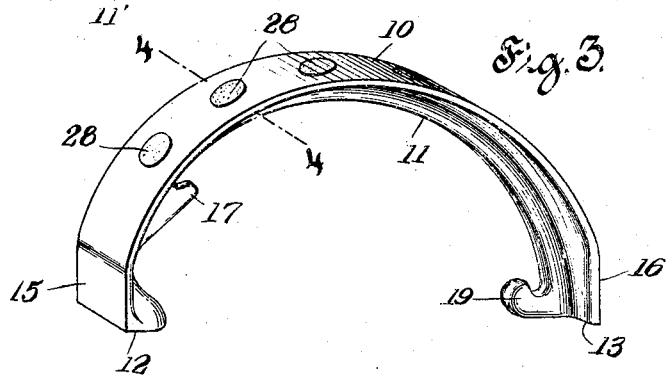
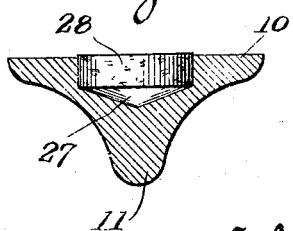
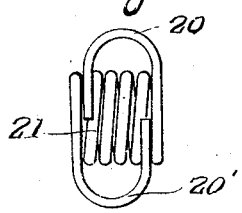
INVENTOR
John H. Graham
BY
Warren E. Willis
ATTORNEY Patented Apr. 22, 1930

1,755,645

UNITED STATES PATENT OFFICE

JOHN HECTOR GRAHAM, OF NEW YORK, N. Y.

BRAKE SHOE

Application filed August 5, 1927. Serial No. 211,270.

This invention relates to improvements in friction brakes, as used on rotative parts, particularly the wheels of vehicles, whereby their action may be controlled up to the point of actual cessation of rotation.

One of the objects of the invention is to provide a fixed interior brake shoe element made in two equal but opposed parts articulated at their point of support in such manner as to avoid breakage, due to sudden strains and shocks as transmitted to them by the circumjacent brake mechanism with which it is co-operatively used.

Another purpose is to produce a new and practical brake shoe composed of a pair of elements held in operative relation by resilient securing means which also operate to maintain the supporting bolt in its adjusted position.

A further aim is in the provision of elastic friction plugs fixed to project from the contacting surfaces of the brake shoe, these plugs or blocks being seated on air cushions formed in the shoe lining elements and held in operative extended position by the pneumatic effect of the air contained in the recesses or chambers holding the blocks.

Other valuable aims and objects, such as unusual economy in construction, non-liability of breakage or failure when in use, lightness in weight and ease of assembly, are accomplished by the novel construction, combination and arrangement of parts hereinafter described and shown in the accompanying drawing, forming a material part of this disclosure, and in which:—

Figure 1 is a side elevational view of an embodiment of the invention.

Figure 2 is a fragmentary edge view of the same, showing the manner of its attachment and drawn to an enlarged scale.

Figure 3 is a perspective view of one of the side members in detail.

Figure 4 is a transverse sectional view, taken on line 4—4 of Figure 3, drawn to a further enlarged scale.

Figure 5 is a side view of the resilient connecting and supporting member.

Referring more in detail to the drawing, the numerals 10 and 10' designate a pair of fixed brake shoe elements, each presenting a generally arcuate shape so as to constitute essentially a circle when in operative relation.

Extending inward from the circumferential rims, which may be of any desired width, are central ribs 11 and 11' reaching from one of their ends 12 and 12' to the opposite ends 13 and 13', these latter ends being spaced as shown to receive securing means, further on described, while the inreaching flat ends 12 and 12' have between them a space to receive the cam-like expander 14 by which the sides are forced apart when it is desired to set the brake.

Both elements 10 and 10' are provided with straight flat surfaces 15 and 15' at the ends 12 and 12', similar surfaces 16 and 16' being formed at the ends 13 and 13', the curved surfaces blending into the straight surfaces smoothly, presenting no abrupt jont.

Hook shaped projections 17 and 17' reach re-entrantly outward from the ribs 11 and 11', near the ends between which the expander element 14 is engaged, and secured to these projections are eyes formed at the ends of stems extending from a coiled tension spring 18 which draws the adjacent ends of the brake shoe elements against the expander, maintaining the space or gap closed upon it.

At the opposite side of the brake shoe element are inreaching hook knobs 19 and 19', their adjacent surfaces being level with the ends 13 and 13'.

Engaged with these knobs are the opposed bights or end loops 20 and 20', of an openly wound helical, tension spring 21, the coil of which is disposed in the space transversely between the ends 13 and 13' in the manner of a pivot and acting as a spring yoke to draw these ends firmly against the exterior of the coil but permitting moderate relative lateral or longitudinal movement of the elements 10 and 10' without danger of fracture.

The numeral 22 designates a fragmentary part of the usual support, into which is screw-threaded a bolt 23, encircled by the coil 21 and having a head 24 which preferably slightly compresses the spring and preventing turning of the bolt by jar and vibration, the bolt being further locked by the castle nut 25, held in adjustment by a cotter pin 26, as best shown in Figure 2.

Frictional adhesion of the brake is provided for by a plurality of recesses or chambers 27 formed at intervals in rows or staggered relation in the surfaces of the elements 10 and 10' and into which are fitted cork discs or plugs 28, the same normally extending slightly above the surface and their inner side enclosing air in the bottom of the chambers, as best seen in Figure 4, the air being compressed by insertion of the cork, sufficiently to assure that the cork will make the necessary frictional contact to the enclosing brake ring to act effectively when the expander or cam 14 is operated.

In recapitulation, it is to be noted that the elements 10 and 10' are exact duplicates, that the connecting devices are yieldable, permitting relative motion, thereby being essentially self-centering, equalizing the strain transmitted to the main members, and that danger of failure by fracture is substantially eliminated, the air cushioned, friction-making inserts are peculiarly well adapted to provide a quiet, efficient grip, not affected by oil, water, heat or cold, require no lubrication, and while capable of long wear and continuous service, can be easily replaced at a trifling expense.

It is further pointed out that these brake elements can readily be substituted for others as originally incorporated, no change in the brake ring, supports, expanders or other structural details of the vehicle being required.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:—

1. In a friction brake, an internal expansible ring comprising a pair of brake members arranged in opposed relation, and plugs of natural cork set in the peripheral surface of said members to present a yielding frictional grip engageable with the co-operating element of the brake.

2. In a friction brake, an internal expansible ring comprised of duplicate sector shaped members, said members each having a plurality of peripheral recesses, and natural cork plugs set in the mentioned recesses to make frictional contact with the co-operative portion of the brake, there being an air space in the recesses below the plugs.

3. In a friction brake having an expansible ring, a plurality of chambered recesses formed at spaced intervals in said ring, and natural cork plugs inserted in the recesses, filling the outer portions thereof and extending operatively outward, said plugs comprising and enclosing air at the bottom of the recesses whereby a pneumatic cushion effect is attained.

4. In a frictional brake having an expansible ring, a plurality of chambered recesses formed at spaced intervals in said ring, the walls of the recesses being dense and impervious, and cork plugs accurately fitted to the recess, said plugs compressing the air at the bottom of the recesses whereby a pneumatic cushion action is obtained adapted to press said plugs outwardly.

In testimony whereof I have signed my name to this application.

JOHN HECTOR GRAHAM.